Dec. 6, 1955 D. COLLIVA 2,725,797
APPARATUS FOR MAKING ASBESTOS CEMENT PIPES
Filed April 15, 1953 2 Sheets-Sheet 2
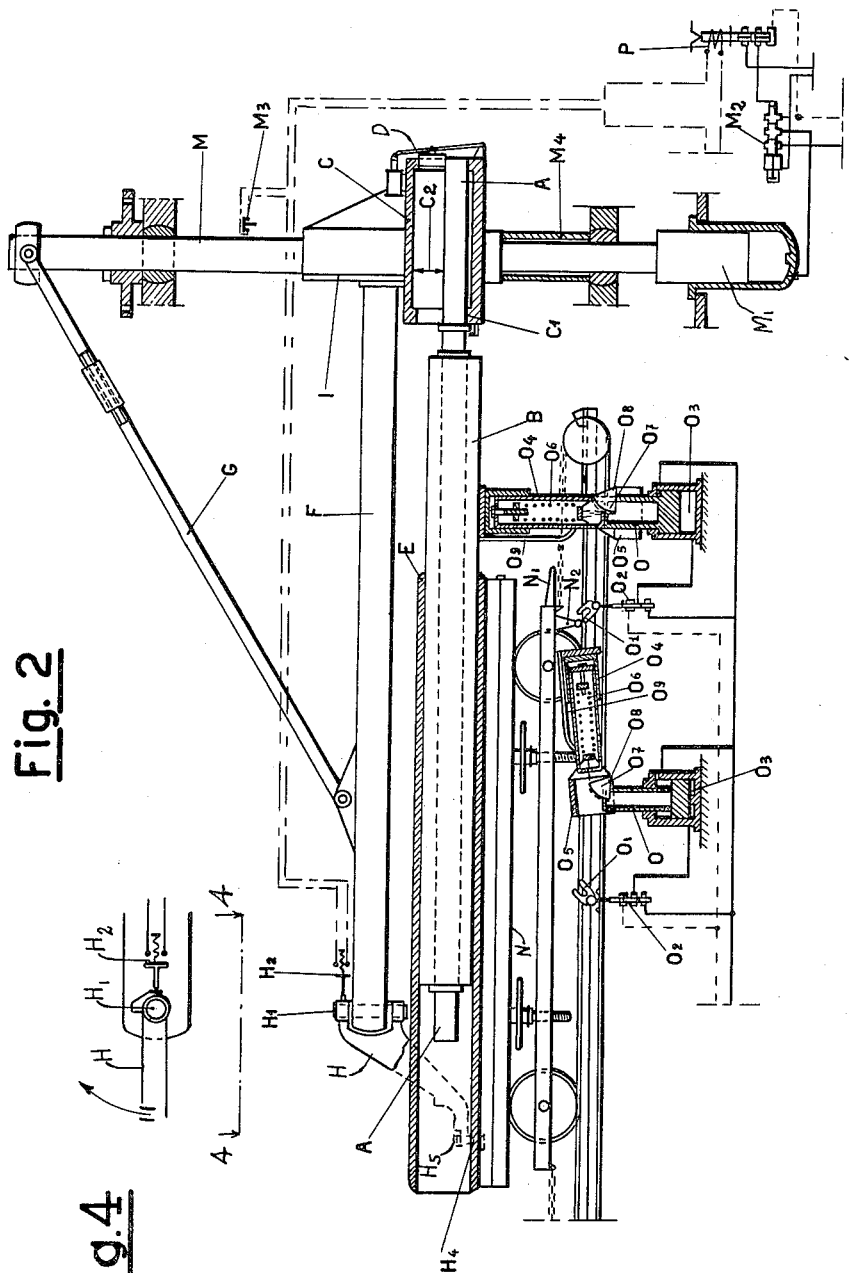

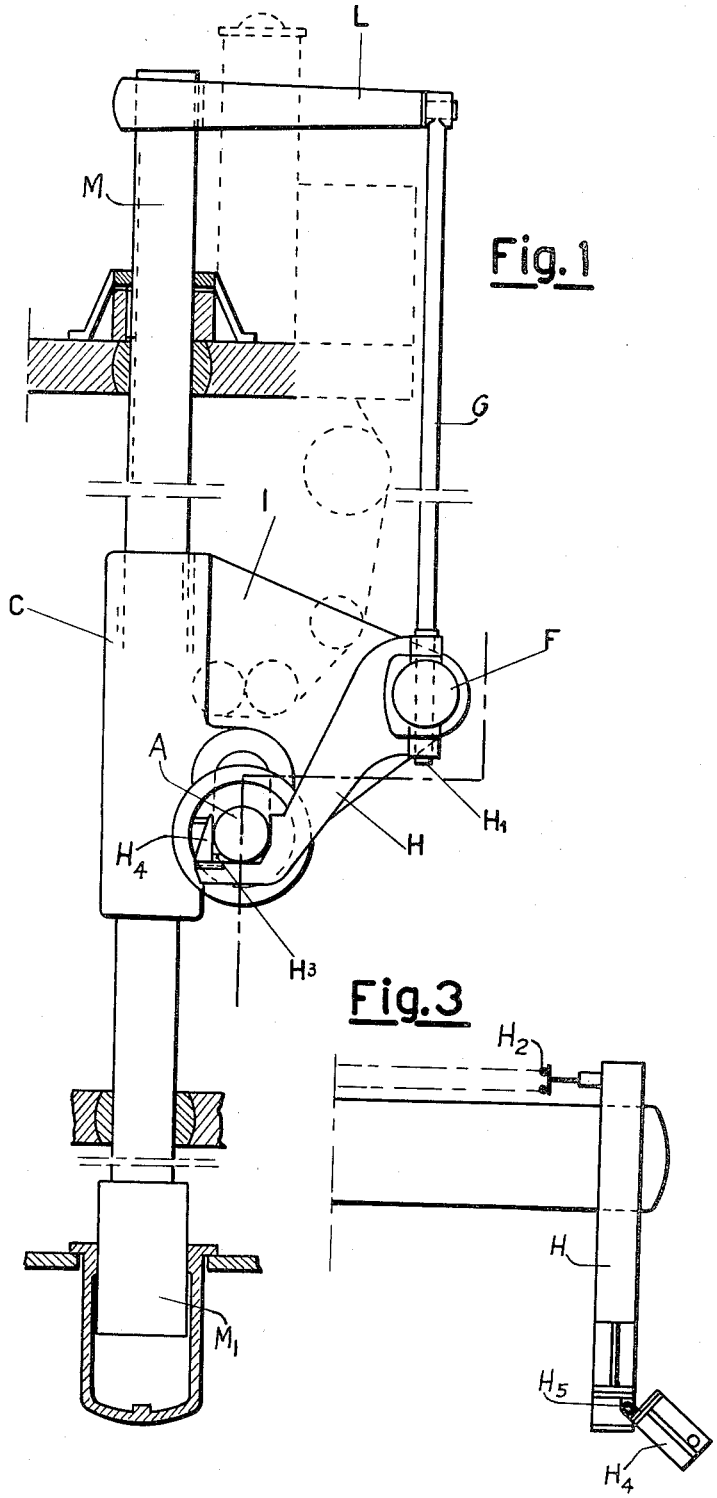

United States Patent Office 2,725,797
Patented Dec. 6, 1955

2,725,797

APPARATUS FOR MAKING ASBESTOS CEMENT PIPES

Dante Colliva, Milan, Italy, assignor to Società Alessandro Calzoni, Bologna, Italy Application April 15, 1953, Serial No. 348,994

Claims priority, application Italy April 16, 1952

2 Claims. (Cl. 92—66)

In machines for manufacturing tubes or pipes, in particular tubes or pipes of cement asbestos (asbestos fiber and Portland cement) of the kind described in U. S. A. patent specification No. 1,627,104, the main supporting shaft carrying the mandrel and the mandrel on which the pipe is formed are supported in an overhanging position by a support rigid with a column rotatable about a vertical axis. When the tube or pipe is formed, the shaft has to carry the complete weight of the assembly: shaft, mandrel and tube, and hence is heavily stressed at the support, causing considerable flexure and limiting the length of the assembly and, therefore, of the tube or pipe that it is possible to manufacture.

The invention relates to a device, which eliminates in said machines the inconvenience mentioned above, and which is described hereinafter with reference to an illustrative embodiment given by way of example and shown in the accompanying drawing, wherein:

Fig. 1 represents the device during formation of the tube or pipe;

Fig. 2 the same during the extraction of the tube or pipe;

Fig. 3 is a particular of Fig. 2;

Fig. 4 is a plan view of the portion taken on line 4—4 of Fig. 2.

The device is substantially composed of two parts: one accommodated on the tube forming machine and having the task of supporting the assembly of the shaft, mandrel and tube, during the rotation of the assembly about the vertical axis from the position in which the tube or pipe is formed on the mandrel to the position in which the formed tube is removed from the mandrel; the other one, accommodated along the path of the carriage for taking off the tube or pipe, has the task of supporting the shaft and mandrel as the carriage extracts or removes the tube or pipe. The first part is substantially formed by: a strut F, a stay G, a mobile arm H. The strut F is rigidly secured to the hinge C by the connecting structure I, while the stay G is attached to the arm L which is rigidly connected to the shaft M, to which the hinge C is also rigidly connected.

The strut F is spaced from the mandrel carrying shaft A to provide sufficient clearance therebetween for the maximum diameter tube or pipe to be made. The arm H, the length of which is determined by the spacing between strut F and shaft A, can rotate about the vertical axis $H_1$ accommodated at the free end of the strut F; hence it can assume two terminal positions.

The position indicated in Fig. 1, where the arm H is fitted into the mandrel carrying shaft A, and supports it at the end opposite to that of the hinge, is the operative position of the arm H, which the latter occupies during the rotation of the whole assembly about the axis M, and during the positioning of the machine.

The other position of the arm H, illustrated in Figure 2, is accurately at 90° from the preceding one (and, therefore, leaves the end of the shaft A completely free, permitting the extraction of the formed tube or pipe), and is assumed only when the tube and mandrel assembly rests on the extracting carriage N of conventional type, which will not be described here. The system is completed by electromechanical safeties preventing errors of operation.

The electrical contact $H_2$, actuated by the movement of rotation of arm H, controls the hydraulic electro-distributor P so as to prevent the lifting of the piston $M_1$ (which lifts the entire assembly of the shaft M, hinge C, shaft A, strut F and stay G) when the arm H is open, that is, in the position of Figure 2, and permits lifting of the piston $M_1$ only if the arm H is closed as in Fig. 1.

This safety permits the shaft A to be lifted from the support of the posts O or of the carriage N only if the shaft A is again supported also by the arm H.

The dog $H_3$ prevents positively the rotation of the arm H until the shaft A, having come to rest on the carriage N, performs a slight vertical movement allowed by the free stroke $C_2$ existing in the hinge, which detaches the end of the mandrel carrier from the arm H by an amount slightly larger than the height of the dog $H_3$.

The arm H is completed by the small mobile hand $H_4$ rotating about the horizontal axis $H_5$, which has the task of locking horizontally the shaft A carrying the mandrel and of rendering it perfectly rigid with the arm H. Said hand $H_4$ has to be rotated as shown by Figure 3 prior to rotating the arm H.

The part of the device which supports the shaft A and the mandrel B as a formed pipe is being removed from the latter comprises posts O actuated hydraulically for up and down movement and having stems $O_4$ supported hingedly thereon for tilting relative to the axis of the post. Such posts are provided in sufficient number, depending on the length of the tube or pipe, along the path of the carriage N.

On the carriage there is provided the abutment $N_1$ (having length equal to the length of the carriage) and the finger $N_2$. This finger $N_2$ engages in the forks $O_1$ which actuate by way of suitable transmissions the hydraulic distributors $O_2$ controlling hydraulically the vertical movements of pistons $O_3$.

The tiltable parts $O_4$ are suitably balanced by the counterweights $O_5$ and by springs $O_6$ automatically tensioned by sectors $O_7$ when the posts are tilted towards the horizontal position by the carriage N. The result of these two forces is that the posts O assume automatically the vertical position when the carriage frees them. It should be noted that the axes of tilting $O_8$ of the articulated parts are offset with respect to the centre of the posts, so that the weight supported by the top surface of part $O_4$ and acting downwardly in line with the center of the post O forms a couple about the axis $O_8$ which prevents tilting of the part $O_4$.

Operation is as follows:

Let us suppose that the assembly of hinge-shaft-mandrel-tube be in position on the machine and the carriage N far away. When the carriage N moves toward the shaft M, the finger $N_2$, touching the forks $O_1$, moves them taking them to the position indicated in Figure 2, with the result that the related cylinder below the piston $O_3$ is opened to discharge, and the piston goes down. Subsequently the abutment $N_1$ touches the sabre-like member $O_9$ and tilts the movable part of the post O, which remains permanently tilted because the abutment $N_1$ is as long as the carriage.

If the carriage is in position and the tube is formed, the distributor $M_2$ is operated from the control board. This distributor can receive the remote control in that the electro-hydraulic locking mechanism P is open, the arm H being in regular position.

The lifting of the piston $M_1$ (the upward stroke whereof is protected by the end-of-stroke stop $M_3$ which stops it automatically in case of forgetfulness of the operator) causes detaching of the tube formed from the machine and allows rotation of the whole assembly in its raised condition from the orientation shown in Figure 1 to that shown in Figure 2.

When the tube is perfectly over the carriage N, remote control is imparted to the distributor $M_2$ in the opposed sense; then the piston $M_1$ descends taking the tube to rest upon the extracting carriage N. The end-of-stroke stop at the lower end of the piston stroke is obtained with fixed abutments $M_4$ registered in such a manner as to allow the piston $M_1$ and the strut F to perform the short excess stroke necessary to liberate the dog $H_3$ of the arm H. After releasing the dog $H_3$, the hand $H_4$ and then the arm H are successively rotated liberating the arm carrying the mandrel and, hence, permitting removal of the tube in the axial direction. It is possible then to move the carriage in the direction out from under the mandrel.

The translatory movement of the carriage N liberates automatically the posts O; each of which as a first movement assumes the vertical position (because the abutment $N_1$ first liberates the sabre-member $O_9$), and then they are lifted by the pistons $O_3$ actuated by the rotation of the forks $O_1$ struck by the finger $N_2$. The length assumed by the posts O if lifted by the pistons $O_3$ of course can be registered in such a manner as to bring it to contact the mandrel without subjecting said posts to excessive stresses.

What I claim is:

1. In a machine for making pipes of cement; the combination of a horizontal mandrel on which a pipe is formed; a reciprocatable carriage movable along a path extending parallel to the axis of said mandrel and at a level below the latter for removing the formed pipe from the mandrel; devices for supporting said mandrel when said carriage is positioned remote from said mandrel, each of said supporting devices including a vertical cylinder disposed below said mandrel, a piston working in said cylinder, between raised and lowered positions, a post tiltably mounted on said piston, and means yieldably urging said post to an erect position in which the upper end of the post is operative to engage and support the mandrel when said piston is in said raised position in the related cylinder; means on said carriage engageable with said post of each supporting device as the carriage moves under said mandrel to tilt said post from said erect position thereof; actuating means for raising and lowering said piston of each supporting device; and controlling means for said piston actuating means operative in response to movement of said carriage under said mandrel to cause downward movement of the piston of each supporting device prior to tilting of the related post, and in response to movement of said carriage out from under said mandrel to cause upward movement of the piston following the return of the related post to said erect position whereby said upper end of the post of each supporting device can have a surface of relatively large area to adequately support the mandrel.

2. In a machine for making pipes of cement; the combination according to claim 1; wherein said actuating means includes conduits for supplying pressure fluid to the opposite ends of the cylinder of the related supporting device; and wherein said controlling means includes valve means interposed in said conduits and determining the end of said cylinder to which pressure fluid is supplied, a valve control member for each of said valve means rockably mounted adjacent said path of the carriage at a location in advance of the related cylinder, rocking of said valve control member in one direction being operative to condition the related valve means for supplying of pressure fluid to the upper end of the associated cylinder, while rocking of said valve control member in the other direction being operative to condition said related valve means for supplying of pressure fluid to the lower end of said associated cylinder; and an abutment on said carriage rocking each of said valve control members in said one direction during movement of said carriage under said mandrel and in said other direction during movement of said carriage out from under said mandrel.

References Cited in the file of this patent

UNITED STATES PATENTS

| | | |
|---|---|---|
| 1,479,149 | Mattei et al. | Jan. 1, 1924 |
| 1,499,620 | Ladd | July 1, 1924 |